United States Patent
Seok

(10) Patent No.: US 12,537,656 B2
(45) Date of Patent: Jan. 27, 2026

(54) PHYSICAL LAYER PROTOCOL DATA UNIT FORMAT INCLUDING PADDING IN A HIGH EFFICIENCY WIRELESS LAN

(71) Applicant: NEWRACOM, INC., Lake Forest, CA (US)

(72) Inventor: Yongho Seok, Lake Forest, CA (US)

(73) Assignee: Atlas Global Technologies LLC, Austin, TX (US)

( * ) Notice: Subject to any disclaimer, the term of this patent is extended or adjusted under 35 U.S.C. 154(b) by 654 days.

(21) Appl. No.: 17/494,728

(22) Filed: Oct. 5, 2021

(65) Prior Publication Data

US 2022/0029771 A1    Jan. 27, 2022

Related U.S. Application Data

(63) Continuation of application No. 14/831,627, filed on Aug. 20, 2015, now abandoned.

(Continued)

(30) Foreign Application Priority Data

Aug. 20, 2014 (KR) ........................ 10-2014-0108178

(51) Int. Cl.
*H04L 5/00* (2006.01)
*H04L 69/324* (2022.01)
(Continued)

(52) U.S. Cl.
CPC .......... *H04L 5/0094* (2013.01); *H04L 5/0007* (2013.01); *H04L 5/0037* (2013.01);
(Continued)

(58) Field of Classification Search
CPC ... H04L 5/0094; H04L 5/0007; H04L 5/0037; H04L 5/0044; H04L 5/0053;
(Continued)

(56) References Cited

U.S. PATENT DOCUMENTS

2011/0096725 A1* 4/2011 Chun ............... H04W 8/26
370/328
2014/0126495 A1* 5/2014 Kubota ............ H04W 72/23
370/329
(Continued)

FOREIGN PATENT DOCUMENTS

WO    WO-2013040752 A1 * 3/2013 ........... H04W 28/06

OTHER PUBLICATIONS

Merlin et al., Methods and Apparatus for Multiple User Uplink (U.S. Appl. No. 61/871,269), filed Aug. 28, 2013, USPTO, whole document (Year: 2013).*

(Continued)

*Primary Examiner* — Michael Thier
*Assistant Examiner* — Jose L Perez

(57) ABSTRACT

The present invention relates to a Physical layer Protocol Data unit (PPDU) format including a padding. According to one aspect of the present invention, a method for transmitting data to a plurality of stations on a transmission channel by an Access Point in a WLAN may be provided. The transmission channel may be divided into a plurality of subchannels allocated to the plurality of stations. The method may include generating padding having a length individually for each of one or more subchannels to which paddings are applied among the plurality of subchannels, the length of the padding making transmissions end simultaneously on the plurality of subchannels, and transmitting a PPDU frame including a data unit without the padding or a data unit added with the padding for each of the plurality of subchannels to the plurality of stations on the transmission channel.

20 Claims, 20 Drawing Sheets

Related U.S. Application Data

(60) Provisional application No. 62/146,899, filed on Apr. 13, 2015.

(51) Int. Cl.
*H04W 72/04* (2023.01)
*H04W 74/0833* (2024.01)
*H04W 84/12* (2009.01)

(52) U.S. Cl.
CPC .......... *H04L 5/0044* (2013.01); *H04L 5/0053* (2013.01); *H04L 69/324* (2013.01); *H04W 72/04* (2013.01); *H04W 74/085* (2013.01); *H04W 84/12* (2013.01)

(58) Field of Classification Search
CPC .. H04L 69/324; H04W 72/04; H04W 74/085; H04W 84/12
See application file for complete search history.

(56) References Cited

U.S. PATENT DOCUMENTS

| | | | | |
|---|---|---|---|---|
| 2015/0010019 A1* | 1/2015 | Bao | ........................ | H04L 69/166 370/474 |
| 2015/0063190 A1* | 3/2015 | Merlin | .................. | H04W 72/23 370/312 |
| 2015/0078294 A1* | 3/2015 | Yang | ..................... | H04W 72/21 370/329 |
| 2015/0195816 A1* | 7/2015 | Lee | ........................ | H04W 28/06 370/329 |
| 2015/0365940 A1* | 12/2015 | Chu | ...................... | H04W 74/02 370/329 |
| 2016/0021682 A1* | 1/2016 | Wang | .................. | H04W 40/244 370/329 |
| 2017/0013634 A1* | 1/2017 | Tsuboi | .................. | H04W 72/21 |

OTHER PUBLICATIONS

Merlin et al., Separating Schedule and Trigger Functions for UL MU MIMO and UL OFDMA (U.S. Appl. No. 62/024,989), filed Jul. 15, 2014, USPTO, whole document (Year: 2014).*

Merlin et al., Separating Schedule and Trigger Functions for UL MU MIMO and UL OFDMA (U.S. Appl. No. 62/028,250), filed Jul. 23, 2014, USPTO, whole document (Year: 2014).*

Wang et al., Channel Frame Structure for High Efficiency Wirelesslan (HEW) (U.S. Appl. No. 62/024,822), filed Jul. 15, 2014, USPTO, whole document (Year: 2014).*

Chu et al., Bandwidth/AC Selection and Acknowledge Indication in OFDMA, UL MU, MIMO (U.S. Appl. No. 62/011,332), filed Jun. 12, 2014, USPTO, whole document (Year: 2014).*

* cited by examiner

FIG. 10

| L-STF | L-LTF | L-SIG | HE-SIG-A | HE-STF | HE-LTF | HE-LTF | HE-LTF | HE-LTF | HE-SIG-B | PSDU(AP to STA6) |
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3, STA4) |
| | | | | HE-STF | HE-LTF | HE-LTF | HE-LTF | HE-LTF | HE-SIG-B | PSDU(AP to STA1, STA2) |

| L-STF | L-LTF | L-SIG | HE-SIG-A | HE-STF | HE-LTF | HE-SIG-B | HE-LTF | HE-LTF | HE-LTF | HE-SIG-C | PSDU(STA4 to AP) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(STA3 to AP) |
| | | | | HE-STF | HE-LTF | HE-SIG-B | HE-LTF | HE-LTF | HE-LTF | HE-SIG-C | PSDU(STA2 to AP) |
| | | | | HE-STF | HE-LTF | HE-SIG-B | HE-LTF | HE-LTF | HE-LTF | HE-SIG-C | PSDU(STA1 to AP) |

FIG. 14

| L-STF | L-LTF | L-SIG | HE-SIG-A | HE-STF | HE-LTF | HE-LTF | HE-LTF | HE-LTF | HE-SIG-B | MPDU(AP to STA6) | MAC Padding | PHY Padding | Signal Extension |
|---|---|---|---|---|---|---|---|---|---|---|---|---|---|
| | | | | HE-STF | HE-LTF | HE-LTF | HE-LTF | HE-LTF | HE-SIG-B | MPDU(AP to STA5) | MAC Padding | PHY Padding | Signal Extension |
| | | | | HE-STF | HE-LTF | HE-LTF | HE-LTF | HE-LTF | HE-SIG-B | MPDU(AP to STA3, STA4) | MAC Padding | PHY Padding | Signal Extension |
| | | | | HE-STF | HE-LTF | HE-LTF | HE-LTF | HE-LTF | HE-SIG-B | MPDU(AP to STA1, STA2) | | PHY Padding | Signal Extension |

FIG. 16

| MAC Padding | MPDU(AP to STA6) |
|---|---|
| MAC Padding | MPDU(AP to STA5) |
| MAC Padding | MPDU(AP to STA3, STA4) |
| No MAC Padding | MPDU(AP to STA1, STA2) |

FIG. 18

| Common Info | | | | Per-User Info | | | | | | |
|---|---|---|---|---|---|---|---|---|---|---|
| UL MU Duration | Total LTFs | LTF Duration | Guard Interval | AID | RU Sub-Channel | RU MCS | RU STS | RU Beam-formed | RU Coding | RU STBC |

PHYSICAL LAYER PROTOCOL DATA UNIT FORMAT INCLUDING PADDING IN A HIGH EFFICIENCY WIRELESS LAN

This application is a Continuation of U.S. application Ser. No. 14/831,627, filed on Aug. 20, 2015, which claims the benefit of Korean Patent Application No. 10-2014-0108178, filed on Aug. 20, 2014 and of U.S. Provisional Application No. 62/146,899, filed on Apr. 13, 2015, each of which is hereby incorporated by reference as if fully set forth herein.

BACKGROUND OF THE INVENTION

Field of the Invention

The present invention relates to a Wireless Local Area Network (WLAN), and more particularly, to a Physical layer Protocol Data Unit (PPDU) format including a padding in a High Efficiency WLAN (HEW), a transmitting method, receiving, method, transmitting apparatus, receiving apparatus, and software using the PPDU format, and a recording medium that stores the software.

Discussion of the Related Art

Along with the recent development of information and telecommunication technology, various, wireless communication techniques have been developed. Among them, the WLAN enables a user to wirelessly access the Internet based on radio frequency technology in a home, an office, or a specific service area using a portable terminal such as a Personal Digital Assistant (PEA), a laptop computer, a Portable Multimedia. Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support. High Throughput (HT) at a data processing rate of up to 540 Mbps, minimize transmission errors, and optimize data rates.

As more and more devices such as smartphones have recently supported WLAN, more Access Points (APs) have been deployed to support this trend. Although WLAN devices with high performance conforming to the Institute of Electrical and Electronics Engineers (IEEE) 802.11ac standard are used more than legacy WLAN devices conforming to the IEEE 802.11g/n standard, a WLAN system having higher performance is required due to WLAN device users' increased use of large-capacity content such as an Ultra High Definition UHD) video. A legacy WLAN system seeks to increase a bandwidth and a peak transmission rate, only to fail to increase performance that users actually feel.

HEW standardization is under discussion in a so-called IEEE 80.111x task group. The HEW aims to increase performance felt by users demanding large-capacity, high-rate services, while supporting simultaneous access of many Stations (STAs) in an environment in which a plurality of APs are densely deployed and the coverage of APs is overlapped.

However, there is no specified method for applying a padding to a PPDU frame format in a HEW.

SUMMARY OF THE INVENTION

Objects of the present invention is to provide a Physical layer Protocol Data Unit (PPDU) format including a padding in a High Efficiency WLAN (HEW), and a method and apparatus for transmitting, and receiving signals using the PPDU format.

The objects of the present invention are not limited to the foregoing descriptions, and additional objects will become apparent to those having ordinary skill in the pertinent art to the present invention based upon the following descriptions.

In an aspect of the present invention, a method for transmitting data to a plurality of Stations (STAs) on a transmission channel by an Access Point (AP) in a WLAN may be provided. The transmission channel may be divided into a plurality of subchannels allocated to the plurality of STAs. The method may include generating a padding individually for one or more subchannels to which paddings are applied among the plurality of subchannels, wherein the padding has a length such that transmissions end simultaneously on the plurality of subchannels, and transmitting a PPDU frame including a data unit without the padding or a data unit added with the padding for each of the plurality of subchannels to the plurality of STAs oat the transmission channel.

In another aspect of the present invention, a method for transmitting data to an AP by an STA in a WLAN may be provided. The method may include receiving a trigger frame from the AP, the trigger flame allocating a plurality of subchannels to the STA and one or more other STAs, generating, when a padding, is applied to a subchannel allocated to the STA, the padding having a length such that a transmission on the subchannel allocated to the STA and transmissions on one or more other subchannels allocated to the one or more other STAs end simultaneously, and transmitting a PPDU frame including a data unit without the padding or a data unit added with the padding to the AP on the subchannel allocated to the STA.

In another aspect of the present invention, an AP apparatus for transmitting data to a plurality of STAs on a transmission channel in a WLAN may be provided. The transmission channel may be divided into a plurality of subchannels allocated to the plurality of STAs. The AP apparatus may include a baseband processor, a Radio Frequency (RF) transceiver, a memory, etc. The baseband processor may be configured to generate a padding individually for one or more subchannels to which paddings are applied among the plurality of subchannels, wherein the padding has a length such that transmissions end simultaneously on the plurality of subchannels, and to transmit a PPDU frame including a data unit without the padding or a data unit added with the padding for each of the plurality of subchannel to the plurality of STAs on the transmission channel using the RF transceiver.

In another aspect of the present invention, an STA apparatus for transmitting data to an AP in a WLAN may be provided. The STA apparatus may include a baseband processor, an RF transceiver, a memory, etc. The baseband processor may be configured to receive a trigger frame from the AP, the trigger frame allocating a plurality of subchannels to the STA and one or more other STAs using the RF transceiver, to generate, when a padding is applied to a subchannel allocated to the STA, the padding having a length such that a transmission on the subchannel allocated to the STA and transmissions on one or more other subchannels allocated to the one or more other STAs end simultaneously, and to transmit a PPDU frame including a data unit without the padding or a data unit added with the padding to the AP on the subchannel allocated to the STA using the RF transceiver.

In another aspect of the present invention, a software or computer-readable medium having instructions executable, for an AP apparatus to transmit data to a plurality of STAs on a transmission channel in as WLAN may be provided. The transmission channel may be divided into a plurality of subchannels allocated to the plurality of STAs. The executable instructions may cause the AP apparatus to generate a padding individually for one or more subchannels to which paddings are applied among the plurality of subchannels, wherein the padding has a length such that transmissions end simultaneously on the plurality of subchannels, and to transmit a PPDU frame including a data unit without the padding or a data unit added with the padding for each of the plurality of subchannels to the plurality of STAs on the transmission channel.

In another aspect of the present invention, a software or computer-readable medium having instructions executable for an STA apparatus to transmit data to an AP in a WLAN may be provided. The executable instructions may cause the STA apparatus to receive a trigger frame from the AP, the trigger frame allocating a plurality of subchannels to the STA and one or more other STAs, to generate, when a padding is applied to a subchannel allocated to the STA, the padding having a length such that a transmission on the subchannel allocated to the STA and transmissions on one or more other subchannels allocated to the one or more other STAs end simultaneously, and to transmit a PPDU frame including a data unit without the padding or a data unit added with the padding to the AP on the subchannel allocated to the STA.

It is to be understood that both the foregoing summarized features are exemplary aspects of the following detailed description of the present invention without limiting the scope of the present invention.

According to the present invention, a PPDU format including a padding in a HEW, and a method and apparatus for transmitting and receiving signals using the PPDU format can be provided.

The advantages of the present invention are not limited to the foregoing descriptions, and additional advantages will become apparent to those having ordinary skill in the pertinent art to the present invention based upon the following descriptions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 depicts the starting and ending points of an High Efficiency Long Training Field (HE-LTF) field in a HE PPDU frame format according to the present invention;

FIG. 11 depicts a High Efficiency SIGnal B (HE-SIG-B) field and a High Efficiency SIGnal C (HE-SIG-C) field in the HE PPDU frame format according to the present invention;

FIG. 12 depicts another exemplary HE PPDU frame format according to the present invention;

FIG. 14 depicts an exemplary HE PPDU padding according to the present invention;

FIG. 16 is a view comparing the lengths of MPDU fields on a plurality of subchannels in the example of FIG. 15;

DETAILED DESCRIPTION OF THE INVENTION

Figure 1:
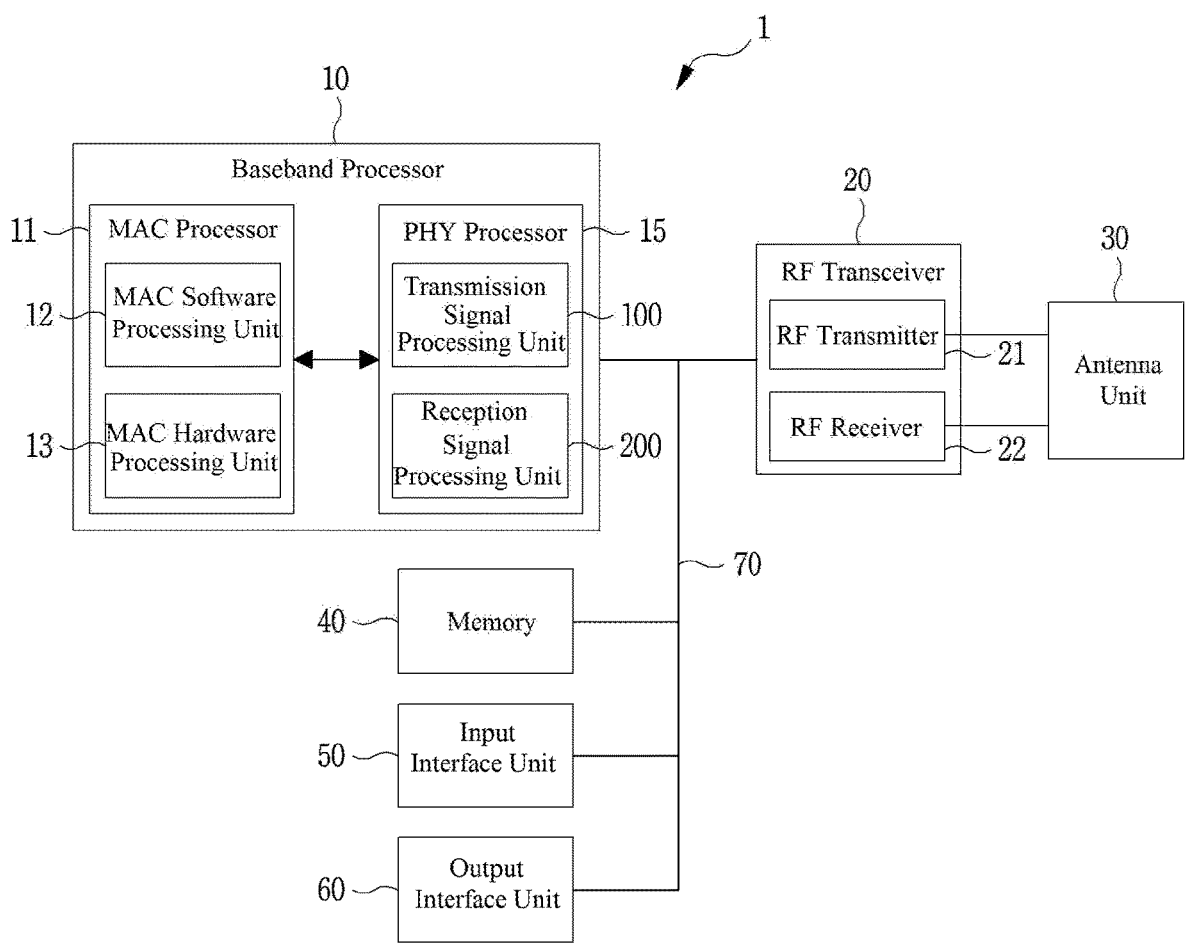
FIG. 1 is a block diagram, of a Wireless Local Area Network (WLAN) device.

In the following detailed description, only certain embodiments of the present invention have been shown and described, simply by way of illustration. As those skilled in the art would realize, the described embodiments ma be modified in various different ways, all without departing from the spirit or scope of the present invention. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include as Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA, inn be each referred to as a STA or may be collectively referred to as STAs. However, for ease of description herein, only the non-AP STAs may be referred to herein as the STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an, output interface unit 60, and a bus 70.

The baseband processor 10 may be simply referred to as a processor, performs baseband signal processing described in the present specification, and includes a MAC processor (or MAC entity) 11 and a PHI processor (or PHY entity) 15.

In an embodiment of the present invention, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer in hardware (hereinafter referred to as 'MAC hardware'). However, the MAC processor 11 is not limited to the foregoing implementation examples.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU MIMO) is used, the antenna unit 30 may include a plurality of antennas.

Figure 2:
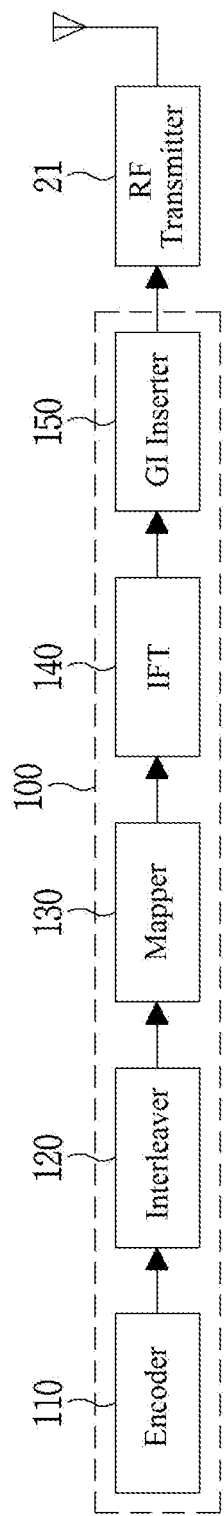
FIG. 2 is a schematic block diagram of an exemplary transmitting signal processing unit in a WLAN.

FIG. 2 is a schematic block diagram of an exemplary transmission signal processor in a WLAN.

Referring to FIG. 2, the transmitting signal processing unit 100 may include an encoder 110, an interleaver 120, a mapper 130, an inverse Fourier Transformer (IFT) 140, and a Guard Interval (GI) inserter 150.

The encoder 110 encodes input data. For example, the encoder 110 may be a Forward Error Correction (FEC) encoder. The FEC encoder may include a Binary Convolutional Code (BCC) encoder followed by a puncturing device, or the FEC encoder may include, a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits, Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{ss}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{ss}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI, The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
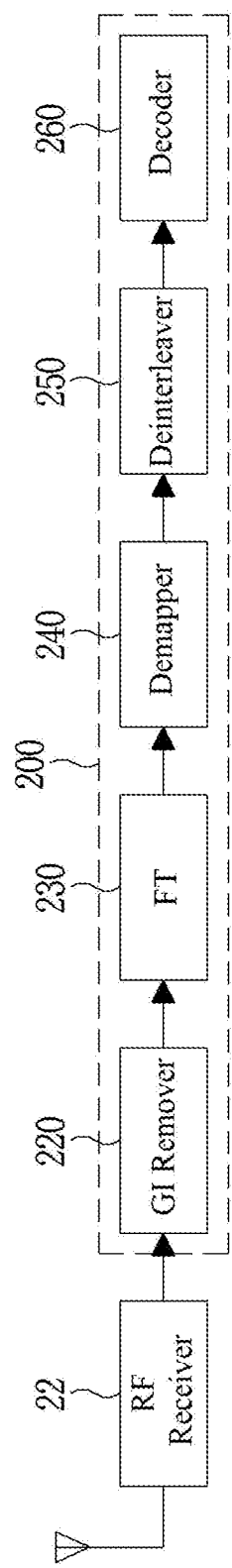
FIG. 3 is a schematic block diagram of an exemplary receiving signal processing unit in a WLAN.

FIG. 3 is a schematic block diagram of an exemplary a receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period e.g., a random backoff period), wait for the delay period without starting transmission, and then attempt to transmit a frame. By applying a random backoff period, a plurality of STAs are expected to attempt frame transmission after waiting tote different time periods, resulting in minimizing collisions.

Figure 4:
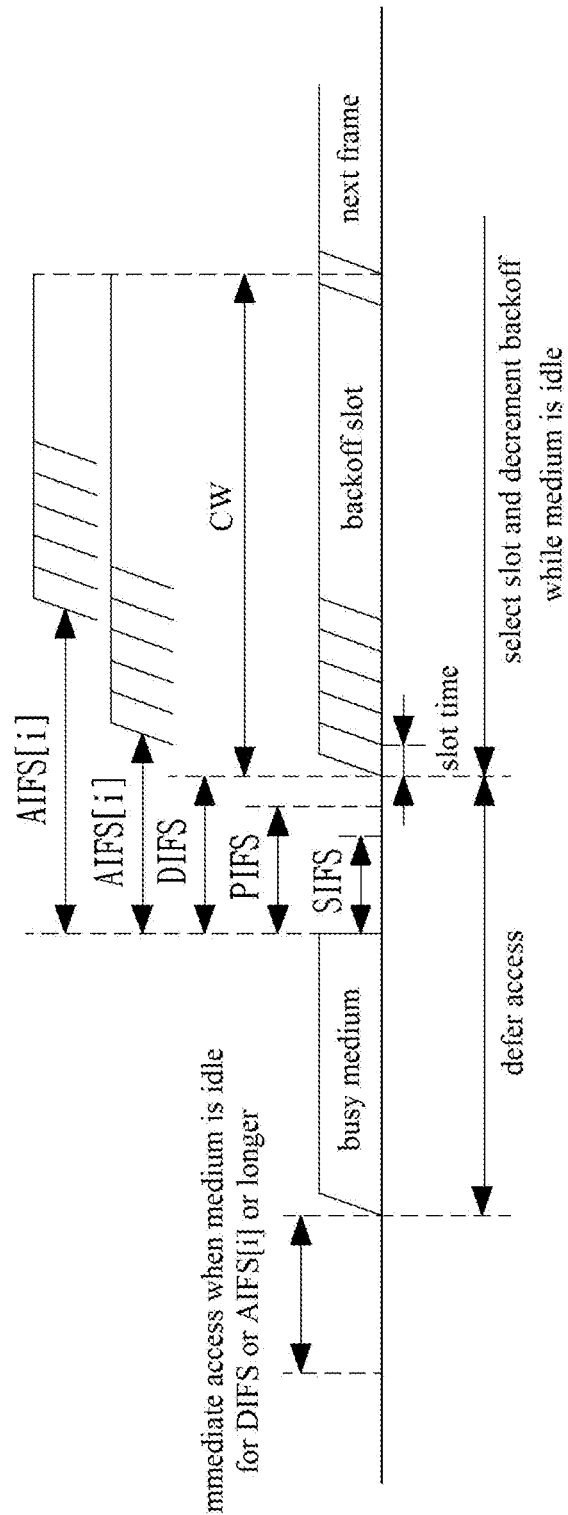
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to another frame, the WLAN device transmits the control frame after performing backoff if the DIFS has elapsed. In case that the control frame is a response frame to another frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated. Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA mays transmit the frame immediately, if it determines that the medium is idle for the DIFS or AIFS[i] or longer. The medium is busy for a time period during which the STA transmits the frame. During the time period, upon generation of a frame to be transmitted, another STA may defer access by continuing that the medium is busy. If the medium gets idle, the STA that intends to transmit the frame may perform a backoff operation after a predetermined IFS in order to minimize collision with an other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff countdown) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
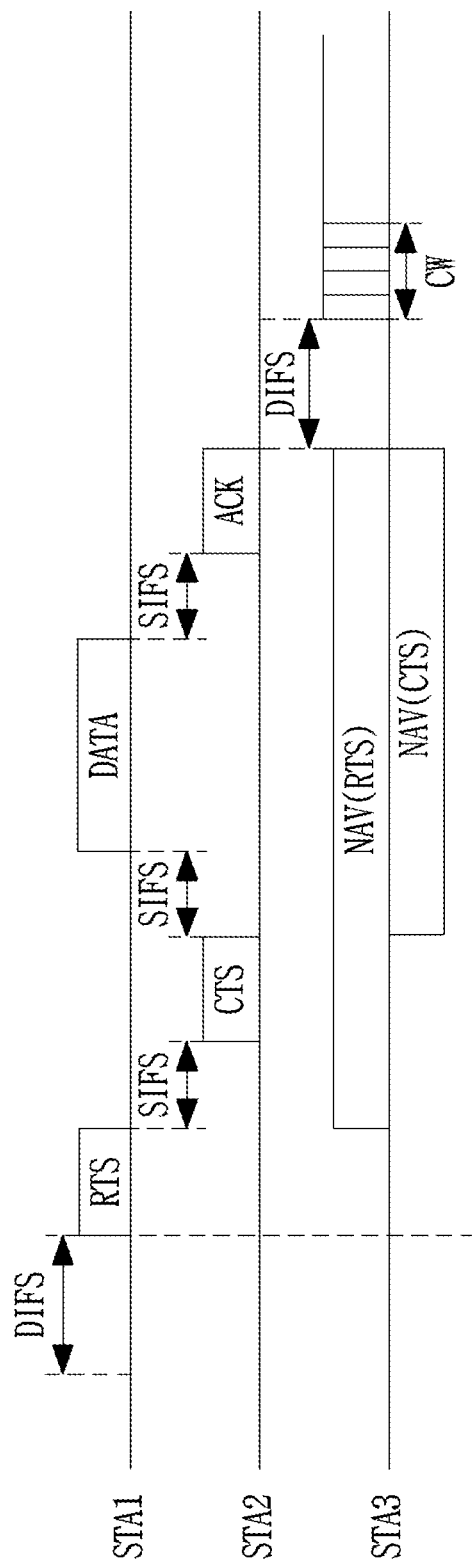
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a to CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIPS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use, by other devices during DIFS and after the NAV timer has expired, STA3 may attempt channel access after a contention window after a random backoff has elapsed.

Figure 6:
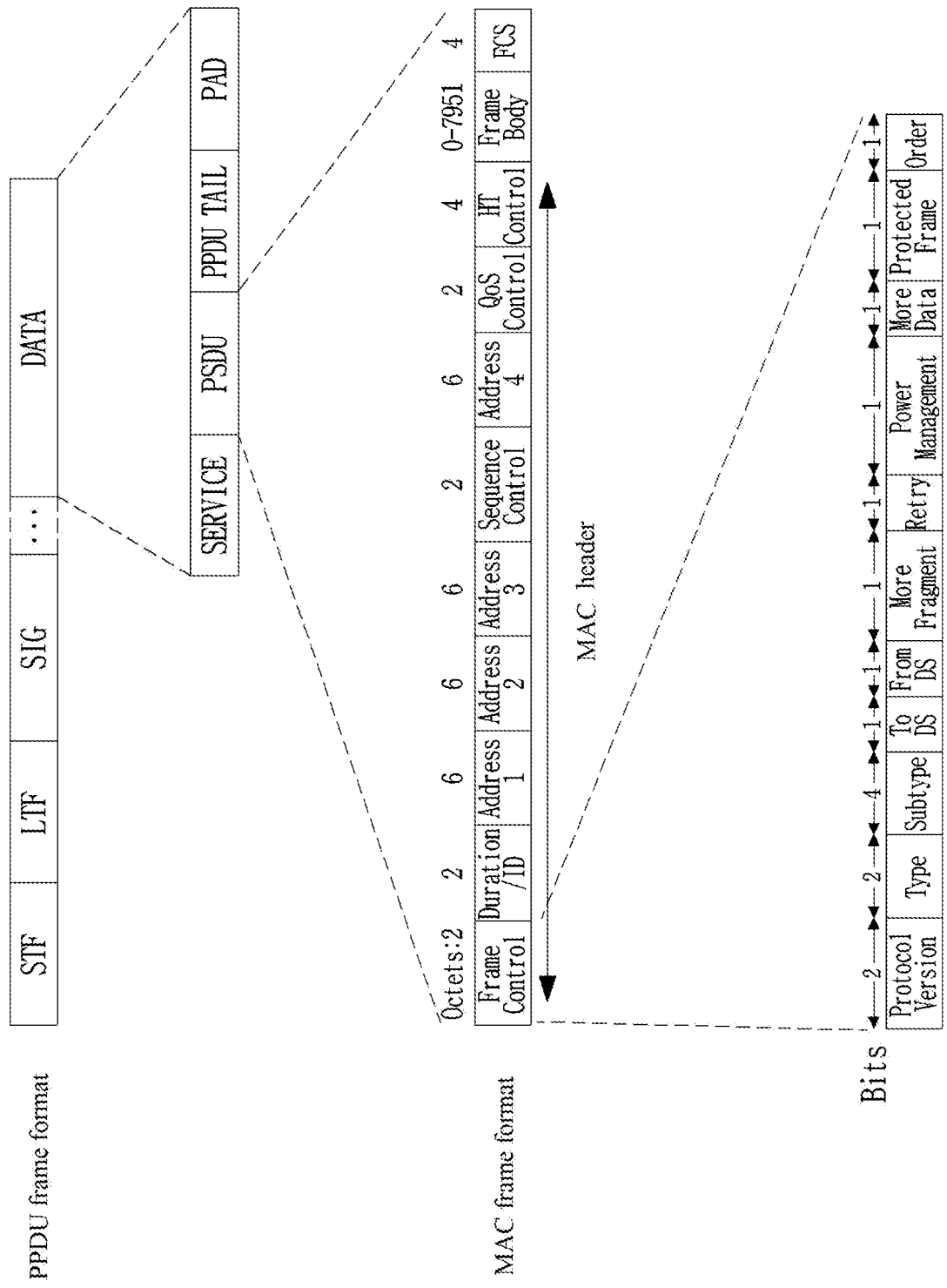
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with, information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The 510 field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and 510 fields) of the general PPDU frame format, without the remaining, part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present invention defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly. HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, OFDMA mode using MU-MIMO in an orthogonal frequency resource.

Figure 7:
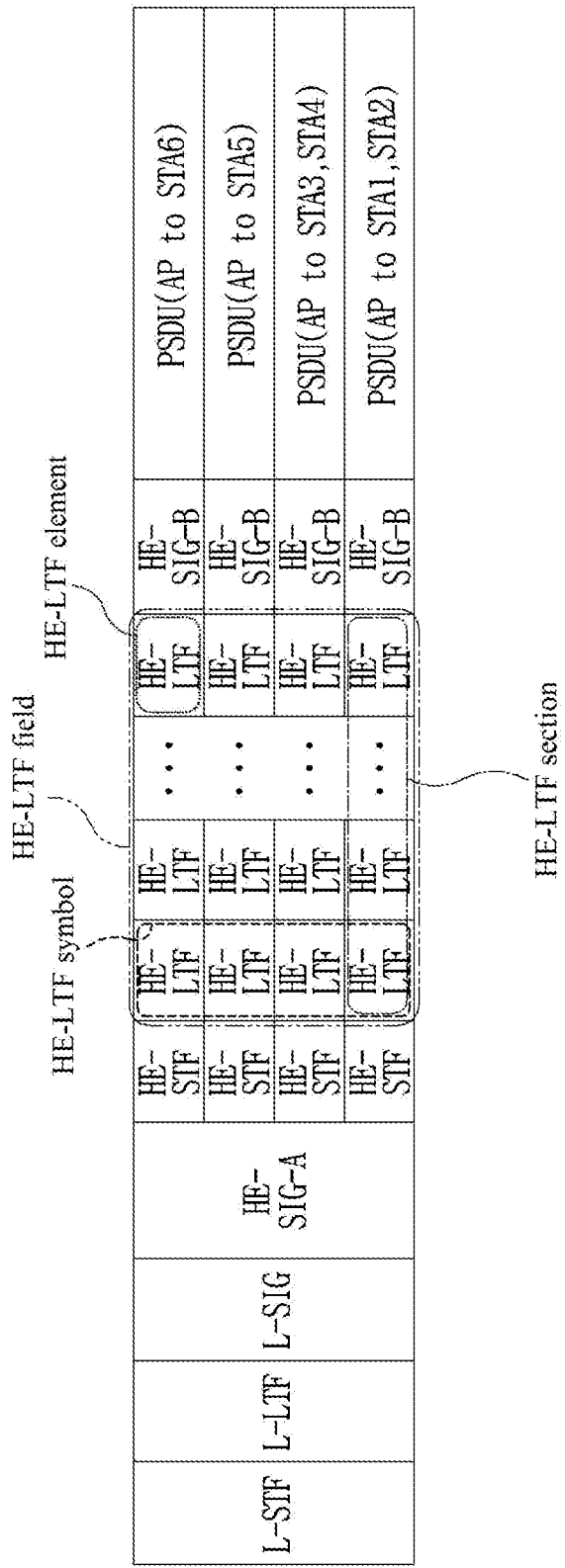
FIG. 7 depicts an exemplary High Efficiency (HE) Physical layer Protocol Data Unit (PPDU) frame format according to the present invention.

FIG. 7 depicts an exemplary HE PPDU frame format according to the present invention.

Referring to FIG. 7, the vertical axis represents frequency and the horizontal axis represents time. It is assumed that frequency and time increase in the upward direction and the right direction, respectively.

In a the example of FIG. 7, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 7, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) car subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 7, a plurality of HE-LTF elements are distinguished in the time and frequency domains. One HE-LTF element may correspond to one OFDM symbol in time domain and one subchannel, unit (i.e., a subchannel bandwidth allocated to a STA) in frequency domain. The HE-LTF elements are logical units and the FRY layer does not necessarily operate in units of an HE-LTF element, ID the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTE sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 1] below, to ensure backward compatibility with legacy STA (e.g., IEEE 802.11ac stations).

TABLE 1

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID, A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[a[where u = 0, 1, . . . , NUM_USERS − 1 and the notation A[b] denotes the value of array A at index b. Zero space-time streams are indicated at positions not listed in the USER_POSITION array. Each user position is set as follows: Set to 0 for 0 space-time streams Set to 1 for 1 space-time streams Set to 2 for 2 space-time streams Set to 3 for 3 space-time streams Set to 4 for 4 space-time streams Values 5-7 are reserved For a VHT SU PPDU: B10-B12 Set to 0 for 1 space-time streams Set to 1 for 2 space-time streams Set to 2 for 3 space-time streams Set to 3 for 4 space-time streams Set to 4 for 5 space-time streams Set to 5 for 6 space-time streams Set to 6 for 7 space-time streams Set to 7 for 8 space-time streams B13-B21 Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set 0, $N_{SYM}$ is defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. |

TABLE 1-continued

| Two parts of VHT-SIG-A | Bit | Field | Number of bits | Description |
|---|---|---|---|---|
| | | | | If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU trasnmission as described in 20.3.11.11.2, set to 0 otherwise. For a VHT MU PPDU: Reserved and set to 1 NOTE-If equal to 1 smoothing is not recommended. |
| | B9 | Reserved | 1 | Reserved and set to 1 |
| | B16-B17 | CRC | 8 | CRC calculated as in 20.3.9.4.4 with c7 in B10, Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 1] illustrates fields, bit positions, numbers of bits, and descriptions included in each of two parts, VET-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VET-SIG-A1 field and has a size of 2 bits. If the 2 bits are set to 0, 1, 2, or 3, the BW field indicates 20 MHz, 40 MHz, 80 MHz, or 160 and 80 MHz. For details of the fields included in the VHT-SIG-A field, refer to the IEEE 802.11ac-2013 technical specification. In the HE PPDU frame format of the present invention, the HE-SIG-A field may include one or more of the fields included in the VHT-SIG-A field, and it may provide backward compatibility with IEEE 802.11ac stations.

Figure 8:
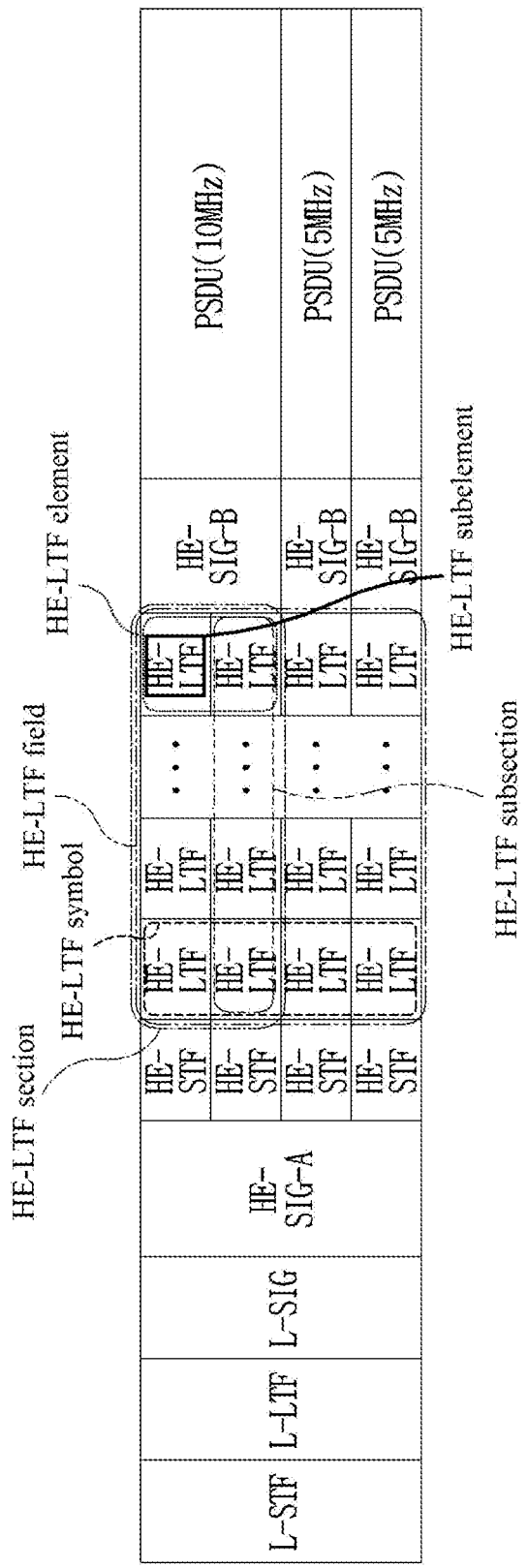
FIG. 8 depicts subchannel allocation in a HE PPDU frame format according to the present invention.

FIG. 8 depicts subchannel allocation in the HE PPDU frame format according, to the present invention.

In the example of FIG. 8, it is assumed that information indicating subchannels to which STAs are allocated in HE PPDU indicates that a subchannel of 0 MHz is allocated to STA1 (i.e., no subchannel is allocated), a subchannel of 5 MHz is allocated to each of STA2 and STA3, and a subchannel of 10 MHz is allocated to STA4.

In the example of FIG. 8, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 8, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 8 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF LTF subelement may correspond to one OFDM symbol in the time domain and one basic subchannel unit (e.g., 5 MHz) in the frequency domain. In the example of FIG. 8, one HE-LTF element includes one HE-LTE subelement in the 5 MHz subchannel allocated to STA2 or STA3. On the other hand, one HE-LTF element includes two HE-LTF subelements in the third subchannel, i.e., 10-MHz subchannel, allocated to STA4. A HE-LTF element and a HE-LTF subelement are logical units and the PHY layer does not always operate in units of as HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 8, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 7, if one channel includes four subchannels, it may not be allowed to keep the third subchannel unallocated and empty, while the first, second, and fourth subchannels are allocated to STAs. However, the present invention does not exclude nonallocation of a intermediate subchannel of one channel to a STA.

Figure 9:
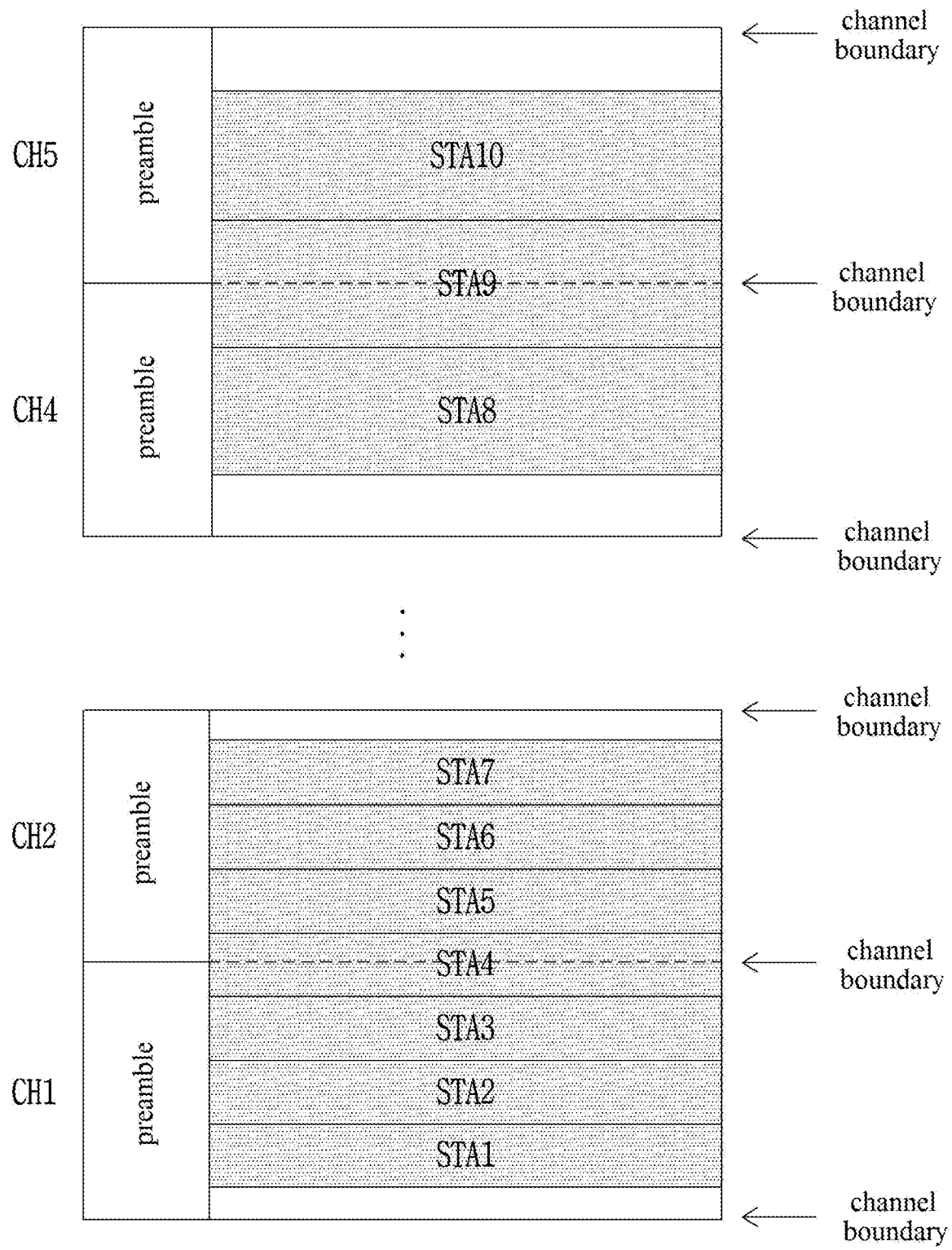
FIG. 9 depicts a subchannel allocation method according to the present invention.

FIG. 9 depicts a subchannel allocation method according to the present invention.

In the example of FIG. 9, a plurality of contiguous channels (e.g., 20-MHz-bandwidth channels) and boundaries of the plurality of contiguous channels are shown. In FIG. 9, a preamble may correspond to an L-STF, an L-LTF, an L-SIG, and a HE-SIG-A as illustrated in the examples of FIGS. 7 and 8.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20 MHz channels.

FIG. 9 is based on the assumption that subchannels each having the size of a basic subchannel unit 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary or belonging to the two channels). In the forgoing example of the present invention, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels), in the forgoing example of the present invention, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present invention and thus should not be construed as the present invention. For example, the bandwidths of a channel and a subchannel may be defined or allocated as values other than the above examples. In addition, a plurality of subchannels in one channel may have the same or different channel widths.

FIG. 10 depicts the starting and ending points of a HE-LTF field in the HE PPM frame format according to the present invention.

To support the MU-MIMO mode and the OFDMA mode, the HE PPDU frame format according to the present invention may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs ma be provided in the HE-SIG-A or HE-SIG-B field, which will be described later in detail.

FIG. 10 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present invention, a relationship between a number of total spatial streams transmitted in one subchannel and a number of HE-LTF are listed in [Table 2].

TABLE 2

| Total number of spatial streams transmitted on one subchannel | Number of HE-LTFs |
|---|---|
| 1 | 1 |
| 2 | 2 |
| 3 | 4 |
| 4 | 4 |
| 5 | 6 |
| 6 | 6 |
| 7 | 8 |

Referring to [Table 2], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFS as a number of adding 1 to the number of the spatial streams need to be transmitted.

Referring to FIG. 10 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 10, a HE-STF, a HE-LTF, a HE-LTF, a HE-LTF, a HE-LTF, and a HE-SIG-B follow the HE-SIG-A field on the subchannel (i.e, four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO mode or OFDMA-mode transmission.

Specifically, the numbers, of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The number of spatial streams transmitted on each subchannel is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO mode or OFDMA-mode transmission. Or it may be said that the lengths of HE-LTF sections are equal on a plurality of subchannels for all users (i.e., HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 7) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 2]). That is, in HE PPDU transmission in the OFDMA mode. When the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTE symbols may be equal to K+1.

When only one STA is allocated to one subchannel in OFDMA mode OFDMA mode without using MU-MIMO), a subchannel having a maximum number of spatial streams across a plurality of subchannels may be determined by the number of spatial streams for a STA allocated to each subchannel. When more than one STA is allocated to one subchannel is OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 7) and transmit a HE PPDU frame including at least the P HE-LTF symbols and a Data field to a receiver. The HE PPDU frame may be divided into Q subchannels in the frequency domain (Q is an integer equal to or larger than 2).

Each of the P HE-LTF symbols may be divided into HE-LTF elements corresponding to the subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTFs section of another subchannel. Also, the HE-LTF sections may start and end at the same time points across the Q subchannels (i.e., across all users or stations).

Referring to FIG. 10 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel SU-MIMO (considering all other subchannels, as plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTEs on the other subchannels, that is, four HE-LTFs are transmitted on the subchannel in order to align the starting points and ending points of the HE-LTF fields of the subchannels.

In the example of FIG. 10, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation STA6 on the fourth subchannel may be said to be placeholders that are actually not used for channel estimation at the STAs.

Figure 11:
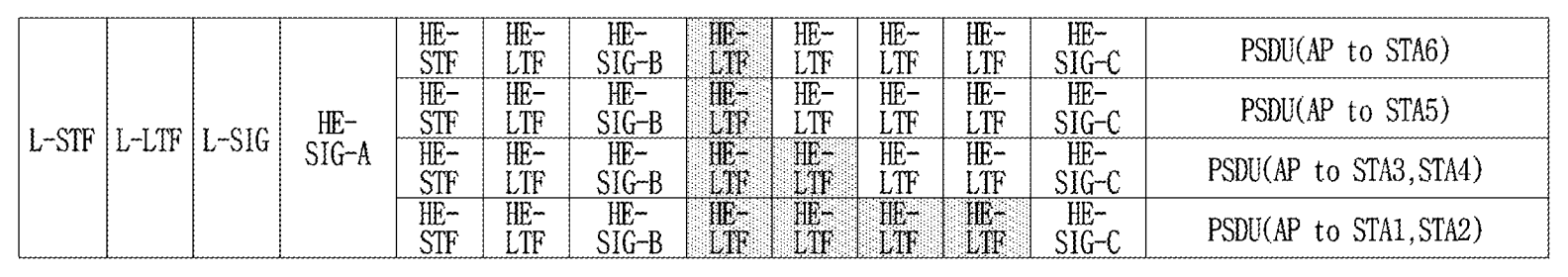

FIG. 11 depicts a HE-SIG-B field and a HE-SIG-C field in the HE PPDU frame format according to the present invention.

To effectively support MU-MIMO-mode or OFDMA-mode transmission in the HE PPDU frame format according to the present invention, independent signaling information may be transmitted on each subchannel. Specifically, a different number of spatial streams may be transmitted to each of a plurality of HE STAs that receive an MU-MIMO-mode or MIMO-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including MCS information about a PSDU and information about the length of the PSDU etc.

With reference to the foregoing examples of the present invention, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission are not applicable only to but also applicable UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE LTF section) on each subchannel), and the number of spatial streams, transmitted on each subchannel, in contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows m relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTF section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Band-Width (BW) information, etc.) for simultaneously transmitted HE PSDUs may be included in HE-SIG-A field, but parameters that may be different for individual STA (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the HE-LTF information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 12 may be used for a UL HE PPDU transmission.

FIG. 12 depicts another exemplary HE PPDU frame format according to the present invention. The HE PPDU frame format illustrated in FIG. 12 is characterized in that a structure of BE-SIG-A, HE-SIG-B, and HE-SIG-C fields similar to in FIG. 10 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE SIG-B field) illustrated in FIG. 12 may not exist. In this case, a description of each field given below may be applied only in the presence of the field.

In the example of FIG. 12, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmissions on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 10.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format to an AP on subchannels allocated to the STAs (i.e., referred to as UL MU-MIMO Or OFDMA transmission or "UL MU transmission"), and a plurality, of STAs may simultaneously receive a PSDU in a HE PPDU frame format from an AP on subchannels allocated to the STAs (i.e., referred to as DL MU-MIMO or OFDMA transmission or "DL MU transmission").

A padding applied to a HE PPDU for DL/UL MU transmission according to the present invention will be described below.

Although a DL/UL MU PPDU supports simultaneous transmission to/from a plurality of STAs, data transmitted to from the STAs may have different lengths. If different subchannels (or resource units) are allocated to the plurality of STAs and the STAs are allowed to terminate DL/UL transmissions at different time points on the different subchannels, another device may access a subchannel on which transmission has been terminated early, thereby making it impossible to protect DL/UL MU transmission.

Further, an STA/AP that receives DL/UL data in a DL/UL MU PPDU may process (e.g., decode) received data within a predetermined time (e.g., an SIFS) after the data reception and transmit an ACK for the received data. Since the DL/UL MU PPDU may include a large amount of data in a frame, the STA/AP may have difficulty in generating and transmitting an ACK within the predetermined time (e.g., the SIFS). Accordingly, the DL/UL MU transmission should be terminated simultaneously on the subchannels allocated to the plurality of STAs in the DL/UL MU PPDU. For this purpose, a padding may be applied to the DL/UL MU PPDU in the present invention. Because the padding corresponds to a non-data transmission time period (i.e., a time period over which no actual data to be received is transmitted to a receiver of the DL/UL MU PPDU), the padding may be applied for the purpose of securing a time for processing data in the STA/AP receiving the DL/UL MU PPDU. A detailed description will be given of specific embodiments of a padding applied to a DL/UL MU PPDU according to the present invention.

First, a plurality of types of paddings according to the present invention will be described in detail with reference to FIG. 13. In the present invention, a plurality of types of paddings may be defined and used. The plurality of types of paddings include MAC padding, PHY padding, and extension padding and two or more of the padding types may be used.

Figure 13:
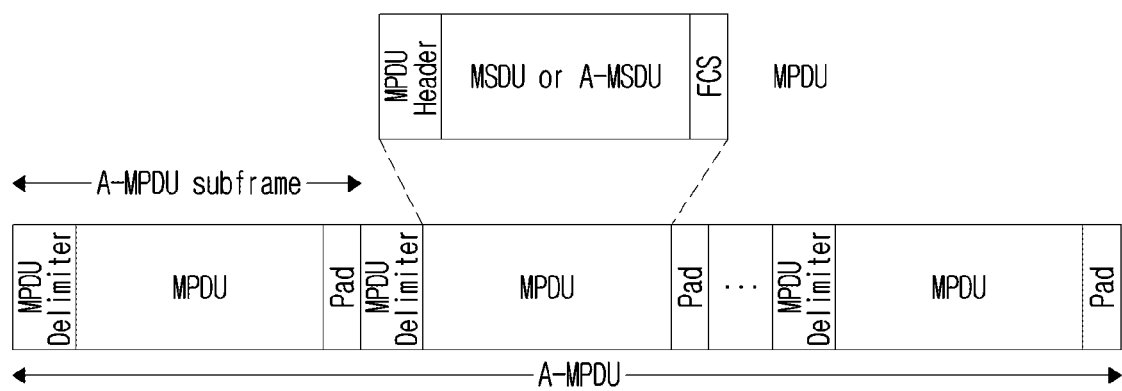
FIG. 13 depicts a configuration of an Aggregated-MAC Protocol Data Unit (A-MPDU)

FIG. 13 depicts a configuration of an Aggregated-MAC Protocol Data Unit (A-MPDU).

To transmit a plurality of MPDUs in one PPDU frame, the MPDUs may be aggregated. As illustrated in FIG. 13, the MAC layer may configure an A-MPDU by logically concatenating a plurality of MPDUs. The A-MPDU may include a plurality of A-MPDU subframes. An A-MPDU subframe may include an MPDU Delimiter and an MPDU, and when needed, the A-MPDU may further include a PAD. One MPDU may be configured by including one MSDU or A-MSDU (i.e., configured by concatenating a plurality of MSDUs) and attaching an MPDU Header and an FCS (i.e., CRC) before and after the MSDU/A-MSDU, respectively.

According to the present invention, MAC padding includes adding a necessary number of padding bits after an MPDU including actual payload. For example, an MPDU (i.e., an A-MPDU subframe) of a predetermined size may be added after an MPDU including actual payload. If one MPDU including actual payload is transmitted, an A-MPDU subframe of a predetermined size may be added after an A-MPDU subframe including the MPDU. If a plurality of MPDUs including actual payload are transmitted, an A-MPDU subframe of a predetermined size may be added after an A-MPDU subframe including the last of the plurality of MPDUs.

The MPDU (or A-MPDU subframe) of the predetermined size added for MAC padding may correspond to one or more 4-octect MPDUs (or A-MPDU subframes) having null data (e.g., an MSDU of 0 octet). That is, the MPDU (or A-MPDU subframe) of the predetermined size added for MAC padding may correspond to one or more 4-octet MPDUs (or A-MPDU subframes) each having anti MPDU Length field set to (i.e., a null MPDU) and an End Of Frame (EOF) set to 1 (i.e., EMT of an A-MPDU) in the MPDU Delimiter.

Further, a MAC padding may be applied individually to each subchannel (or resource unit) of a DL/UL MU PPDU according to the present invention. For example, a plurality of subchannels allocated within one transmission channel (e.g., a 20-MHz bandwidth) may be allocated to a plurality of STAs. Although a MAC padding may be applied to a first subchannel of the DL/UL MU PPDU, a MAC padding may not be applied (i.e., a MAC padding of size 0 may be applied) to a second subchannel of the DL/UL MU PPDU. Further, even though a MAC padding is applied to each of the plurality of subchannels in the DL/UL MU PPDU, the size of MAC padding bits of the first subchannel may be different from the size of MAC padding bits of the second subchannel. The lengths of the MAC paddings applied to the individual subchannels may be determined so that the DATA fields of the plurality of subchannels may end at the same time point in the DL/UL MU PPDU.

In addition to MAC paddings, PHY paddings may be applied to the DL/UL MU PPDU.

The PHY layer may configure an A-MPDU with one PSDU. A PPDU frame includes a preamble (e.g., a legacy preamble (i.e., an L-STF, an L-LTF, and an L-SIG) and a HE-preamble (i.e., a HE-SIG-A, a HE-LTF, etc.), and one or more PSDUs. When needed, the PPDU frame may further include a PAD field PHI padding bits). The PHY padding is used to match the number of coded bits of the last OFDM symbol to a predetermined criterion (e.g., an integer multiple of a parameter value (i.e., the value of an $N_{CBPS}$ parameter) for coded bits per OFDM symbol). The PHY padding may be applied to each individual subchannel (or resource unit) of the DL/UL MU PPDU. Further, a PHY padding of the same value may be applied commonly to the subchannels (or resource units) of the DL/UL MU PPDU.

In addition to a MAC padding and a PHY padding, an extension padding may be added to the end of the DL/UL MU PPDU.

The extension padding may be added after the PPDU is configured with the MAC padding and the PHY padding and may correspond to a time length that extends signal emission after the last symbol of the PPDU. For example, if the DL/UL MU PPDU is transmitted in 2.4 GHz, the extension padding may correspond to a Signal Extension field or packet extension having a time length of 6 μs, which should not be construed as limiting the present invention. The extension padding may be applied to each individual subchannel (or resource unit) of the DL/UL MU PPDU. Further, an extension padding of the same value may be applied commonly to the subchannels (or resource units) of the DL/UL MU PPDU.

FIG. 14 depicts an exemplary HE PPDU padding according to the present invention.

The example of FIG. 14 corresponds to a case in which the transmission start timings of PSDUs are identical (or aligned) OR a plurality of subchannels in a HE PPDU format. If HE-LTF fields start at the same time point and end at the same time point on the plurality of subchannels (i.e., the lengths of the HE-LTF fields are equal across the plurality of subchannels), the transmission start timings of the PSDUs may be identical (or aligned) on the plurality of subchannels. In this case, puddings may be applied individually to the plurality of subchannels, for simultaneous termination of MU transmissions on the plurality of subchannels in the HE PPDU.

A padding (e.g., one or more of a MAC padding and a PHY padding) may be added based on a subchannel having the longest data unit (e.g., MPDU field) to be transmitted among the plurality of subchannels.

For example, a padding (e.g., one or more of a MAC padding and a PHY padding) may be added to each of one or more subchannels (i.e., subchannels having shorter data units than the longest data unit) except for the subchannel having the longest data unit among the plurality of subchannels. The size of the puddings (e.g., one or more of MAC paddings and PHY paddings) added to the individual one or more subchannels may be determined to be values so that the lengths of the data units may be equal to the length of the longest data unit.

Or a padding (e.g., one or more of a MAC padding and a PHY padding) may be added individually to each of the plurality of subchannels in such a manner that the lengths of data units added with paddings (e.g., one or more of MAC puddings and PHY paddings) may be equal across the plurality of subchannels. That is, a padding (e.g., one or more of a MAC padding and a PHY padding) having a length, exceeding 0 may also be applied to a subchannel having the longest data unit among the plurality of subchannels. In this case, the length of the padding applied to the subchannel having the longest data unit may be smaller than the lengths of the puddings (e.g., one or more of MAC paddings and PHY paddings) added to the other subchannels.

If PHY paddings of the same length are applied to the plurality of subchannels, a MAC padding may be added, for example, based on a subchannel having the longest MPDU field among the plurality of subchannels. In the example of FIG. 14, an MPDU field may correspond to one MPDU or A-MPDU. An MPDU length may be represented in units of an OFDM symbol duration (or in OFDM symbols) of an MPDU transmitted on a subchannel.

In the example of FIG. 14, since the MPDU field of a first subchannel (i.e., a subchannel on which an AP transmits an MPDU field to STA1 and STA2) is longest, a MAC padding may be added to a subchannel having a shorter MPDU field than the longest MPDU field. For example, the lengths of MAC paddings added to a second subchannel a subchannel on which the AP transmits an MPDU field to STA3 and STA4), a third subchannel (i.e., a subchannel on which the AP transmits an MPDU field to STA5), and a fourth subchannel (i.e., a subchannel on which the AP transmits an MPDU field to STA6) may be determined so that the lengths of A-MPDUs having the MPDU fields and MAC paddings may be equal to the length of the MPDU field on the first subchannel.

Also, MAC paddings may be applied to all of the plurality of subchannels. That is, a MAC padding having a length exceeding 0 may also be applied to a subchannel having the longest MPDU field among the plurality of subchannels. In this case, the MAC padding applied to the subchannel having the longest MPDU field may be shorter than the MAC puddings applied to the other subchannels.

In addition to a MAC padding, a PHY padding may be applied to each of the plurality of subchannels in the HE PPDU in order to fill the coded bits of the last symbol on each of the plurality of subchannels in the HE PPDU.

In addition to the MAC padding and the PHY padding, an extension padding (e.g., a Signal Extension field) may be added to each of the plurality of subchannels in the HE PPDU.

Figure 15:
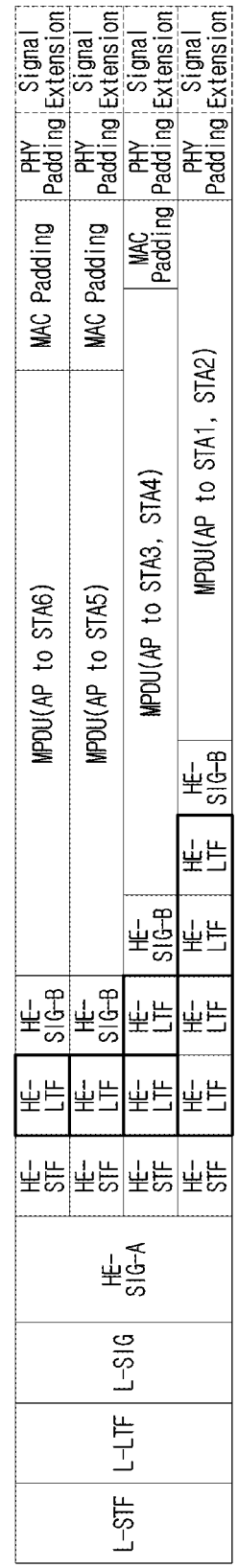
FIG. 15 depicts another exemplary HE PPDU padding according to the present invention.

FIG. 15 depicts another exemplary HE PPDU padding according to the present invention.

The example of FIG. 15 corresponds to a case in which the transmission start timings of PSDUs are not identical or aligned) on a plurality of subchannels in a HE PPDU format. If different HE-LTF section lengths are set for the plurality of subchannels, the transmission start timings of the PSDUs may be different on the plurality of subchannels. In this case, paddings may be applied individually to the plurality of subchannels to simultaneously terminate MU transmissions on the plurality of subchannels in the HE PPDU.

A padding (e.g., one or more of a MAC padding and a PHY padding) may be added based on a subchannel having the largest sum of the lengths of a data unit (e.g., an MPDU field) to be transmitted and a HE-LTF section (refer to FIG. 7 or FIG. 8) among the plurality of subchannels.

For example, a padding (e.g., one or more of a MAC padding and a PHY padding) may be added to each of one or more subchannels (i.e., subchannels each having the sum of the lengths of a data unit and a HE-LTF section smaller than the largest sum) except for the subchannel having the largest sum of the lengths of a data unit and a HE-LTF section among the plurality of subchannels. The size of a padding (e.g., one or more of a MAC padding and a padding) added individually to each of the one or more subchannels may be determined so that the sum of the lengths of a data unit on each of the one or more subchannels may be equal to the largest sum of the lengths of a data unit and a HE-LTF section.

Or a padding (e.g., one or more of a MAC padding and a PHY padding) may be added individually to each of the plurality of subchannels in such a manner that the sums of the lengths of data units added with paddings (e.g., one or more of MAC paddings and PHY paddings) and HE-LTF sections may be equal across the plurality of subchannels. That is, a padding (e.g., one or more of a MAC padding and a PHY padding) having a length exceeding 0 may also be applied to the subchannel having the largest sum of the lengths of a data unit and a HE-LTF section among the plurality of subchannels. In this case, the length of a padding applied to the subchannel having the largest sum of the lengths of a data unit and a HE-LTF section may be smaller than the lengths of paddings (e.g., one or more of MAC paddings and PHY paddings) added to the other subchannels.

If PHY paddings of the same length are applied to the plurality of subchannels, a MAC padding may be added, for example, based on a subchannel having the largest sum of the lengths of a data unit and a HE-LTF section (refer to FIG. 7 or FIG. 8) among the plurality of subchannels. In the example of FIG. 15, an MPDU field may correspond to one MPDU or A-MPDU. An MPDU length may be represented in units of an OFDM symbol duration (or in OFDM symbol) of an MPDU transmitted on a subchannel, A HE-LTF length may be represented in units of an OFDM symbol duration (or in OFDM symbols) and may correspond to the transmission time of a Space-Time Stream (STS) training sequence.

In the example of FIG. 15, since the sum of the lengths of an MPDU field and a HE-LTF section is largest for the first subchannel (i.e., the subchannel on which the AP transmits an MPDU field to STA1 and STA2), a MAC padding may be added to a subchannel having a smaller sum of the lengths of an MPDU field and a RE-LTF section than the largest sum. For example, the lengths of MAC paddings added to the second subchannel (i.e., the subchannel on which the AP transmits an MPDU field to STA3 and STA4), the third subchannel (i.e., a subchannel on which the AP transmits an MPDU field to STA5), and the fourth subchannel (i.e., the subchannel on which the AP transmits an MPDU field to STA6) may be determined so that the sums of the lengths of the MPDU fields, the HE-LTF sections, and the MAC paddings may be equal to the sum of the lengths of the MPDU field and the HE-LTF section on the first subchannel.

In addition to a MAC padding, a PHY padding may be applied to each of the plurality of subchannels in the HE PPDU in order to fill the coded bits of the last symbol on each of the plurality of subchannels in the HE PPDU.

In addition to the MAC padding and the PHY padding, an extension padding (e.g., a Signal Extension field) may be added to each of the plurality of subchannels in the HE PPDU.

According to the HE PPDU paddings described with reference to the examples of FIGS. 14 and 15, transmissions may end at the same time point on a plurality of subchannels in a DL/UL MU PPDU. That is, transmissions to a plurality of STA may end at the same time point in a DL MU-MIMO or OFDMA MIMO PPDU according to a HE PPDU padding of the present invention.

FIG. 16 is a view comparing the lengths of MPDU fields of a plurality of subchannels in the example of FIG. 15.

Whether to apply a MAC padding to a subchannel and the size of the MAC padding may be determined based on the length of an MPDU field on each subchannel in the example of FIG. 14. On the other hand, whether to apply a MAC padding to a subchannel and the size of the MAC padding may be determined based on the sum of the lengths of an MPDU field and a HE-LTF section on each subchannel in the example of FIG. 15.

As described above, while a MAC padding is not applied to a subchannel having the longest MPDU field among a plurality of subchannels in the example of FIG. 14, a MAC padding may also be applied to a subchannel having the longest MPDU field in the example of FIG. 15, as illustrated in FIG. 16. This is because whether to apply a MAC padding and the size of the MAC padding are determined based on the length of a HE-LTF section as well as the length of an MPDU field on a subchannel in the example of FIG. 15. However, a HE PPDU may be terminated at the same time point on a plurality of subchannels according to the HE PPDU paddings of the present invention in both examples of FIGS. 14 and 15.

Figure 17:
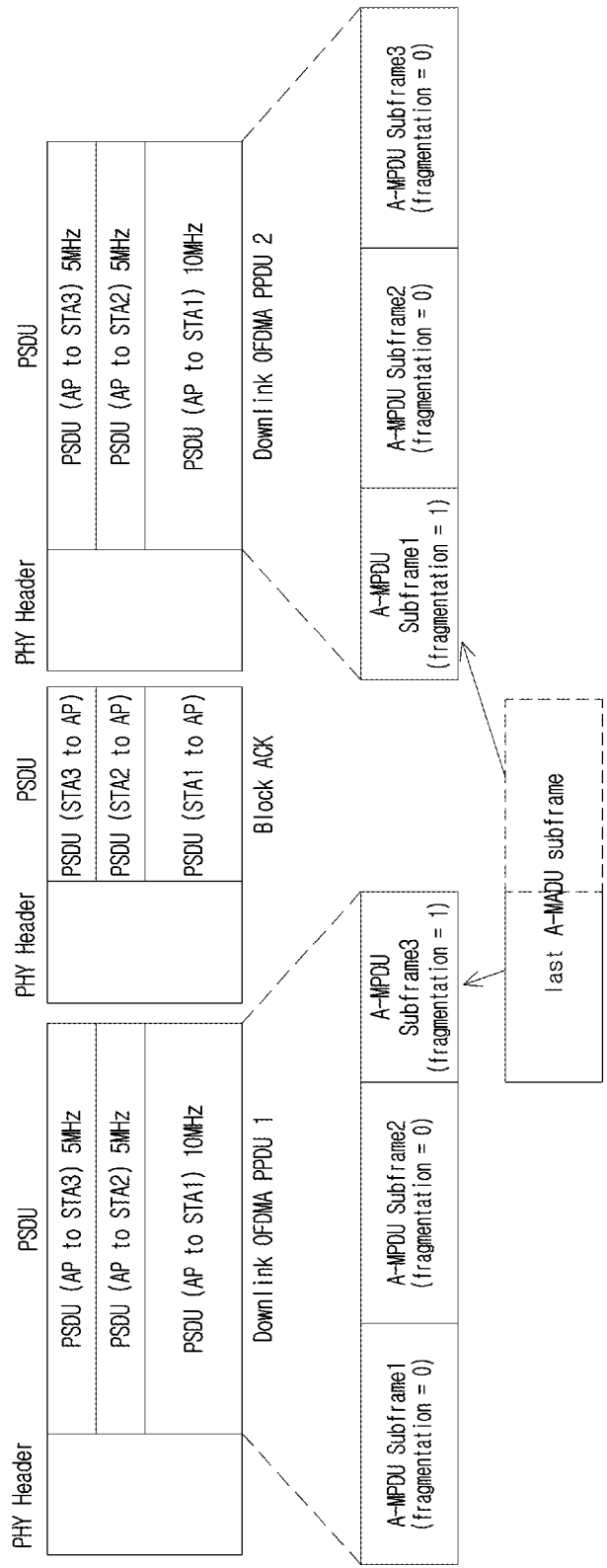
FIG. 17 depicts another exemplary HE PPDU padding according to the present invention, and FIG. illustrates an exemplary format of a trigger frame.

FIG. 17 depicts another exemplary HE PPDU padding according to the present invention.

As described before, a MAC padding, a PHY padding, an extension padding, etc. may be applied to simultaneously terminate transmissions on a plurality of subchannels in a DU/UL MU PPDU. In the foregoing examples, an A-MPDU EOF padding, that is, adding a null MPDU for a MAC padding has been described. An additional exemplary MAC padding will be described with reference to the example of FIG. 17.

As in the example of FIG. 14 or FIG. 15, whether to apply a MAC padding and the length of the MAC padding may be determined for each of a plurality of subchannels in a DL/UL MU PPDU. The example of FIG. 17 is based on the assumption that a MAC padding is applied to a first subchannel (a subchannel on which the AP transmits a PSDU to STA1) of a first DL MU PPDU (i.e., DL OFDMA PPDU 1). A PSDU of the first subchannel may correspond to an A-MPDU and the A-MPDU may include A-MPDU subframe 1 and A-MPDU subframe 2. A-MPDU subframe 3 may be configured to a length corresponding to the size of a MAC padding applied to the first subchannel. That is, an A-MPDU subframe may be configured instead of a MAC padding field in the example of FIG. 14 or FIG. 15. A-MPDU subframe 3 may correspond to a fragment of an original A-MPDU subframe, as described later.

Specifically, if a last A-MPDU subframe is completely transmitted on a subchannel of a DL/UL MU PPDU it may occur that an MU PPDU duration (or allowed TXTIME) set for the DL/UL MU PPDU is exceeded. In this case, the last A-MPDU subframe of the DL UL MU PPDU may be split into two fragments. The length of the first of the two fragments may be determined to be equal to the length of a MAC padding determined in the example of FIG. 14 or FIG. 15.

For example, if a last A-MPDU subframe destined for STA1 is transmitted in DL OFDMA PPDU 1 in the example of FIG. 17 and a TXTIME set for DL OFDMA PPDU 1 is exceeded on a corresponding subchannel, the last A-MPDU subframe may be split into two fragments. The first fragment may be included as A-MPDU subframe 3 in DL OFDMA PPDU 1. If a block ACK frame is received in response to DL OFDMA PPDU 1, the second fragment may be included as A-MPDU subframe 1 in the following DL OFDMA PPDU 2.

If an immediate ACK is received in response to the first fragment of the two split fragments (i.e., the split A-MPDU subframes), the second fragment may be transmitted immediately. For example, MU PPDUs including the two fragments as split A-MPDU subframes may be transmitted successively through an it ACK transmitted at an interval of an SIFS. That is, the interval between an MU PPDU including the first fragment and an ACK PPDU (e.g., a first block ACK frame) transmitted in response to the MU PPDU may be an SIFS, the interval between the ACK PPDU and an MU PPDU including the second fragment may be an SIFS, and the interval between the MU PPDU including the second fragment and an ACK PPDU (e.g., a second block ACK frame) transmitted in response to the MU PPDU may be an SIFS.

Implementation of an MU PPDU exchange sequence including an MPDU split into fragments (e.g., an A-MPDU subframe split into fragments) may be restricted to one TXOP. If all of the MPDU fragments cannot be exchanged within one TXOP, the MU PPDU exchange sequence may be configured not to include the MPDU fragments.

Further, one HE PPDU may be configured not to early at plurality of fragments of one MPDU. That is, a plurality of A-MPDU subframe fragments into which one A-MPDU subframe is split may not be allowed to be included together in one HE PPDU. For example, one A-MPDU subframe is split into three A-MPDU subframe fragments and it may not be allowed that DL OFDMA PPDU 1 includes two of the A-MPDU subframes and DL OFDMA PPDU 2 includes the other A-MPDU subframe. However, A-MPDU subframe fragments split from different A-MPDU subframes may be included in one HE PPDU.

To support transmission of these MPDU fragments (or A-MPDU subframe fragments), a fragmentation subfield (or a split subfield) may be defined in the MPDU delimiter field of an A-MPDU. If the fragmentation subfield is set to 1, this may indicate that the A-MPDU subframe is one of fragments split from one A-MPDU subframe. If the fragmentation subfield is set to 0, this may indicate that the A-MPDU subframe is not a fragment.

In the example of FIG. 17, if the fragmentation subfield of A-MPDU subframe 3 is set to 1 in DL OFDMA PPDU 1, this may indicate that A-MPDU subframe 3 is an A-MPDU subframe fragment. Further, if the fragmentation subfield of A-MPDU subframe 1 is set to 1 in DL OFDMA PPDU 2, this may indicate that A-MPDU subframe 1 is an A-MPDU subframe fragment.

In the example of FIG. 17, if STA1 receives an A-MPDU subframe with a fragmentation subfield set to 1 in DL OFDMA PPDU 1 and fails to immediately receive the subsequent additional A-MPDU subframe with a fragmentation field set to 1 (e.g., within the same TXOP), STA1 may discard the fragment of the received A-MPDU subframe (i.e., A-MPDU subframe 3 of DL OFDMA PPDU 1). On the other hand, if STA1 successfully receives the second frame (i.e. A-MPDU subframe 1 of DL OFDMA PPDU 2) following the first fragment (i.e. A-MPDU subframe 3 of DL OFDMA PPDU 1) (e.g., within the same TXOP), STA1 may acquire information of the original A-MPDU subframe by merging, the two fragments.

In the example of FIG. 17, A-MPDU subframe 3 of DL OFDMA PPDU 2 has a fragmentation subfield set to 0 and thus is not added with a MAC padding or an MPDU fragment corresponding to the length of the MAC padding. Meanwhile, when needed, a MAC padding or an MPDU fragment corresponding to the length of the MAC padding may be added on another subchannel of DL OFDMA PPDU 2.

While not shown in the example of FIG. 17, PHY paddings and extension paddings may be added to DL OFDMA PPDU 1 and a plurality of subchannels of the DL OFDMA PPDU.

While the HE PPDU paddings of the present invention have been described mainly in the context of a DL MU PPDU in FIGS. 14 and 15, the present invention is not limited thereto. According to a HE PPDU padding of the present invention, transmissions may end at the same time point on a plurality of subchannels in a UL MU PPDU. A trigger frame may indicate the end time of the UL MU PPDU (or the length of the UL MU PPDU). That is, transmissions from a plurality of STAs may end at the same time point in a UL MU-MIMO or OFDMA PPDU.

Further, while an example of including an MPDU fragment instead of a MAC padding in a DL MU PPDU has been described with reference to FIG. 17, the present invention is not limited thereto. Transmissions may be configured to end at the same time pint on a plurality of subchannels in a UL MU PPDU by implementing MPDU fragment transmission according to the present invention, A trigger frame may indicate the end time of the UL MU PPDU (or the length of the UL MU PPDU). That is, transmissions from a plurality of STAs may end at the same time point in a UL MU-MIMO or OFDMA PPDU by transmitting an MPDU fragment instead of a MAC padding.

As described above, if an MPDU fragment (or an A-MPDU subframe fragment), is included in a DL/UL MU PPDU instead of a MAC padding, the ending time points of the DL/UL MU PPDU may be aligned on a plurality of subchannels and resource use efficiency may be increased.

FIG. 18 illustrates an exemplary format of a trigger frame.

As illustrated in FIG. 18, a trigger frame eliciting UL MU transmission may include a Common Info field and a Per-User Info field.

In the Common Info field, a UL MU Duration subfield indicates the transmission time of a UL HE PPDU in which a plurality of STAs perform simultaneous UL transmissions, in the examples of the present invention, the ending time (or length) of a UL MU PPDU may be determined based on the value of the UL MU Duration subfield of the trigger frame.

A Total LTFs subfield indicates the number of HE-LTF symbols (e.g., the number of HE-LTF elements for each subchannel) included in the UL HE PPDU.

An LTF Duration subfield indicates the duration or length of a HE-LTF symbol (e.g., the duration or length of a HE-LTF element for each subchannel) included in the UL HE PPDU.

A Guard Interval subfield indicates a guard interval applied to the UL HE PPDU.

In the Per-User Info field, an Association identifier (AID) subfield indicates an ID of an STA participating in the UL MU transmission.

An RU subchannel subfield indicates a subchannel that the STA uses in the UL HE PPDU transmission.

An RU MCS subfield indicates an MCS that the STA uses in the UL HE PPDU transmission.

An RU STS subfield indicates the number of STSs that the STA uses in the UL HE PPDU transmission.

RU Beamformed subfield provides information about beamforming that the STA applies to the UL HE PPDU transmission.

An RU Coding subfield indicates coding (e.g., BCC or LDPC) that the STA uses in the UL HE PPDU transmission.

An RU Space-Time Block Coding (STBC) subfield indicates whether the STA will use STBC for the UL HE PPDU transmission.

Figure 19:
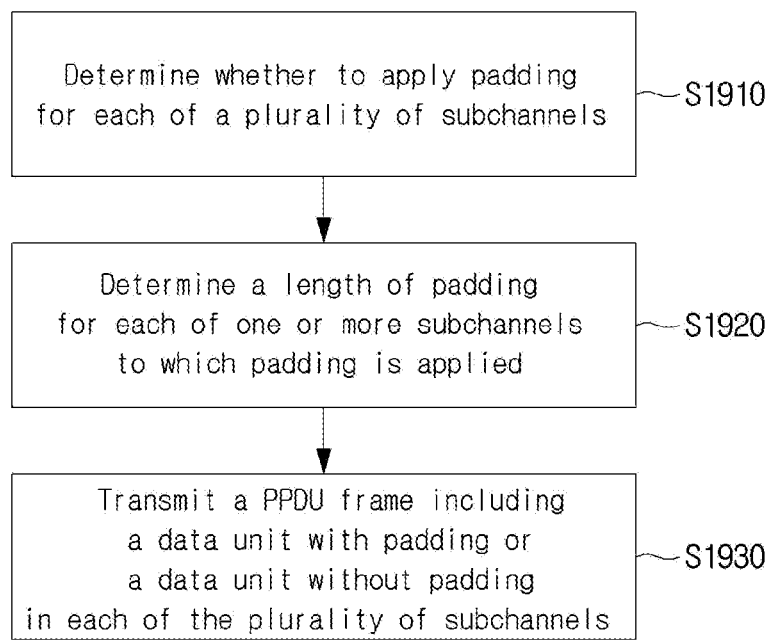
FIG. 19 is a flowchart illustrating an exemplary method according to the present invention.

FIG. 19 is a flowchart illustrating an exemplary method according to the present invention.

In step S1910, an AP may determine whether to apply a padding to each of a plurality of subchannels in order to transmit data to a plurality of STAs on a transmission channel divided into the plurality of subchannels. The determination may be made based on the length of a data unit to be transmitted on each of the plurality of subchannels so that transmissions may end at the same time point on the plurality of subchannels. For example, it may be determined not to apply a padding to a subchannel carrying a longest data unit among the plurality of subchannels. Or it may be determined to apply a padding to a subchannel carrying a short data unit, relative to other subchannels.

In step S1920, the AP may determine a padding length for each of one or more subchannels to which it is determined to apply paddings. A padding length may be determined individually for each subchannel in such a manner that transmissions may end at the same time point on the plurality of subchannels. Meanwhile, it may be said that the padding length is 0 for a subchannel to which it is determined not to apply a padding.

In step S1930, the AP may generate a PPDU (e.g., a DL MU PPDU) including a data unit without a padding or a data unit with a padding (depending on a determination as to whether a padding is to be applied) on each of the plurality of subchannels and may transmit the PPDU on the transmission channel. Or it may be said that the AP generates a PPDU (e.g., a DL MU PPDU) including a data unit added with a padding (the length of the padding is determined to be a value equal to or larger than 0 for each subchannel according to whether a padding is to be applied to the subchannel) on each subchannel and may transmit the PPDU on the transmission channel to the plurality of STAs.

While not shown in FIG. 19, upon receipt of the HE PPDU (e.g., DL MU PPDU) frame from the AP, an STA may transmit an ACK a predetermined time (e.g., an SIFS) after the reception time of the frame. According to various embodiments of the present invention, since a padding added individually to each of a plurality of subchannels in a HE PPDU does not correspond to an actual data transmission period (i.e., a time period over which a DL MU PPDU receiver is supposed to receive data) on the subchannel, the STA may generate the ACK by processing (e.g., decoding) data received during a part or whole of a padding period. In this manner, the STA may further secure a time for transmitting the ACK the predetermined time (e.g. SIFS) after receiving the frame by a padding in the HE PPDU.

Figure 20:
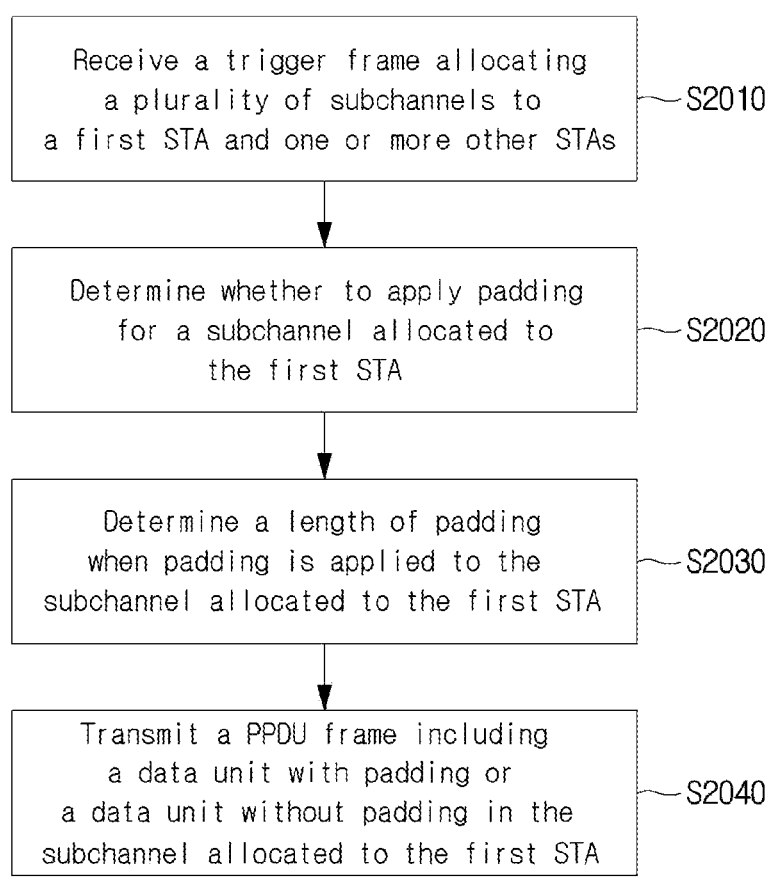
FIG. 20 is a flowchart illustrating another exemplary method according to the present invention.

FIG. 20 is a flowchart illustrating another exemplary method according to the present invention.

In step S2010, a first STA may receive a trigger frame including information required for simultaneous UL transmissions of the first STA and one or more other STAs on a plurality of subchannels subchannel allocation information, and UL MU transmission scheduling information (e.g., information about the length or ending time of UL MU PPDU frame)).

In step S2020, the first STA may determine whether to apply a padding to a subchannel allocated to the first STA. The determination may be made based on the length or ending time of the PPDU frame and the length of a data unit transmitted on the subchannel allocated to the first STA so that transmissions may end at the same time point on the plurality of subchannels. For example, if a transmission ending time based on the length of the data unit transmitted on the subchannel allocated to the first STA is earlier than the length or ending time of the PPDU frame, the STA may determine to apply a padding. Or if the transmission ending time based on the length of the data unit transmitted on the subchannel allocated to the first STA is equal to the length or ending time of the PPDU frame, the STA may determine not to apply a padding.

In step S2030, if the first STA determines to apply a padding to the subchannel allocated to the first STA, the first STA may determine a length for the padding. The length of the padding may be determined based on the length or ending time of the PPDU frame and the length of the data unit transmitted on the subchannel allocated to the first STA so that the transmissions may end at the same time point on the plurality of subchannels. Meanwhile, if a padding is not applied to the subchannel allocated to the first STA, it may be said that the length of the padding is determined to be 0.

In step S2040, the first STA may generate a PPDU including a data unit without a padding or a data unit added with a padding (depending on whether a padding is applied or not) on the subchannel allocated to the first STA and transmit the PPDU to the AP. Or it may be said that the first STA generates a PPDU including a data unit added with a padding on the subchannel allocated to the first STA (i.e., including a padding of a length equal to or larger than 0 depending on whether a padding is applied to each subchannel) and transmits the PPDU to the AP.

While not shown in FIG. 20, upon receipt of the HE PPDU (e.g., the UL MU PPDU) frame from a plurality of STAs, the AP may transmit an ACK a predetermined time (e.g., SIFS) after the reception time of the frame. According to various embodiments of the present invention, since a padding added individually to each of a plurality of subchannels in a HE PPDU does not correspond to an actual data transmission period (i.e., a time period over which a UL MU PPDU receiver is supposed to receive data) on the subchannel, the AP may generate an ACK by processing (e.g., decoding) data received during a part or whole of a padding period. In this manner, the AP may further secure a time for transmitting the ACK the predetermined time (e.g. SIFS) after receiving the frame by a padding in the HE PPDU.

While the exemplary method has been described with reference to FIGS. 19 and 20 as a series of operations for simplicity of description, this does not limit the sequence of steps. When needed, steps may be performed at the same time or in a different sequence. All of the exemplary steps are not always necessary to implement the method according to the present invention.

The foregoing embodiments of the present invention may be implemented independently or one or more of the embodiments may be implemented simultaneously, for the method of FIGS. 19 and 20.

The present invention includes an apparatus for processing or performing the method according to the present invention (e.g., the wireless device and its components described with reference to FIGS. 1, 2, and 3).

The present invention includes software (an operating system (OS), an application, firmware, a program, etc.) for executing the method according to the present invention in a device or a computer, and a medium storing the software that can be executed in a device or a computer.

While various embodiments of the present invention have been described in the context of an IEEE 802.11 system, they are applicable to various mobile communication systems.

What is claimed is:

1. A method for transmitting data to an Access Point (AP) by a Station (STA) in a Wireless Local Area Network (WLAN), the method comprising:
    receiving a trigger frame from the AP, the trigger frame allocating a plurality of subchannels to the STA and one or more other STAs and indicating a length of an uplink (UL) multi-user (MU) Physical layer Protocol Data Unit (PPDU);
    configuring a first Aggregated Media Access Control (MAC) Protocol Data Unit (MPDU) including one or more Aggregated MPDU subframes each including a respective MPDU;
    dividing a first Aggregated MPDU subframe of the one or more Aggregated MPDU subframes into a plurality of subframe fragments, the plurality of subframe fragments each including a respective MPDU fragment;
    generating, for a subchannel allocated to the STA, an MPDU fragment having an MPDU fragment length from a first subframe fragment of the plurality of subframe fragments; and
    transmitting, to the AP, a PPDU frame, the PPDU frame including the MPDU fragment in a transmission on the subchannel allocated to the STA,
    wherein the MPDU fragment length is determined such that the transmission on the subchannel allocated to the STA and transmissions on one or more other subchannels respectively allocated to the one or more other STAs end simultaneously, and
    wherein the PPDU is included in an Orthogonal Frequency Division Multiple Access (OFDMA) UL MU transmission.

2. The method of claim 1, wherein the PPDU frame includes a second Aggregated MPDU (A-MPDU) subframe that precedes the MPDU fragment.

3. The method of claim 1,
    wherein the PPDU is a first PPDU, and
    wherein the method further comprises:
    receiving an immediate Acknowledgement (ACK) from the AP after transmitting the first PPDU, and
    in response to receiving the immediate ACK, transmitting a second PPDU including a second subframe fragment of the plurality of subframe fragments.

4. The method of claim 1, wherein the MPDU fragment length is determined according to the indication of the length of the UL MU PPDU.

5. The method of claim 1, wherein the OFDMA UL MU transmission includes a second MPDU fragment divided from a second A-MPDU subframe different from the first A-MPDU subframe.

6. A wireless device comprising:
    a transmitter; and
    a receiver,
    wherein the wireless device is configured to:
    receive, using the receiver, a trigger frame from an access point (AP) of a Wireless Local Area Network (WLAN), the trigger frame allocating a plurality of subchannels to the wireless device and one or more other wireless devices and indicating a length of an uplink (UL) multi-user (MU) Physical layer Protocol Data Unit (PPDU);

configuring a first Aggregated Media Access Control (MAC) Protocol Data Unit (MPDU) including one or more Aggregated MPDU subframes each including a respective MPDU;

divide a first Aggregated MPDU subframe of the one or more Aggregated MPDU subframes into a plurality of subframe fragments, the plurality of subframe fragments each including a respective MPDU fragment;

generate, for a subchannel allocated to the STA, an MPDU fragment having an MPDU fragment length from a first subframe fragment of the plurality of subframe fragments; and transmit, to the AP using the transmitter, a PPDU frame, the PPDU frame including the MPDU fragment in a transmission on the subchannel allocated to the STA, wherein the MPDU fragment length is determined such that the transmission on the subchannel allocated to the STA and transmissions on one or more other subchannels respectively allocated to the one or more other STAs end simultaneously, and wherein the PPDU is included in an Orthogonal Frequency Division Multiple Access (OFDMA) UL MU transmission.

7. The wireless device of claim 6, wherein the PPDU frame includes a second Aggregated MPDU (A-MPDU) subframe that precedes the MPDU fragment.

8. The wireless device of claim 6,
wherein the PPDU is a first PPDU, and
wherein the wireless device is configured to:
receive an immediate Acknowledgement (ACK) from the AP after transmitting the first PPDU, and
in response to receiving the immediate ACK, transmit a second PPDU including a second subframe fragment of the plurality of subframe fragments.

9. The wireless device of claim 6, wherein the MPDU fragment length is determined according to the indication of the length of the UL MU PPDU.

10. The wireless device of claim 6, wherein the OFDMA UL MU transmission includes a second MPDU fragment divided from a second A-MPDU subframe different from the first A-MPDU subframe.

11. A method for receiving data by an Access Point (AP) from a Station (STA) in a Wireless Local Area Network (WLAN), the method comprising:

transmitting a trigger frame from the AP, the trigger frame allocating a plurality of subchannels to a plurality of STAs and indicating a length of an uplink (UL) multi-user (MU) Physical layer Protocol Data Unit (PPDU);

receiving, by the AP from a first STA of the plurality of STAs, a first PPDU frame including a Media Access Control (MAC) Protocol Data Unit (MPDU) fragment in a first transmission on a subchannel allocated to the first STA, receiving, by the AP from a second STA of the plurality of STAs, a second PPDU frame in a second transmission on a subchannel allocated to the second STA, wherein an MPDU fragment length of the MPDU fragment is determined by the first STA such that the first transmission and the second transmission end simultaneously, and wherein the first PPDU frame and the second PPDU frame are included in an Orthogonal Frequency Division Multiple Access (OFDMA) UL MU transmission, wherein the MPDU fragment corresponds to a first subframe fragment of a plurality of subframe fragments divided from a first Aggregated MPDU (A-MPDU) subframe of an A-MPDU.

12. The method of claim 11,
wherein the first PPDU frame includes a second A-MPDU subframe that precedes the MPDU fragment.

13. The method of claim 11, further comprising:
transmitting an immediate Acknowledgement (ACK) by the AP to the first STA after receiving the first PPDU frame, and
receiving, after transmitting the immediate ACK, a third PPDU frame including a second subframe fragment of the plurality of subframe fragments.

14. The method of claim 11, wherein the MPDU fragment length is determined according to the indication of the length of the UL MU PPDU.

15. The method of claim 11, wherein the OFDMA UL MU transmission includes a second MPDU fragment divided from a second A-MPDU subframe different from the first A-MPDU subframe.

16. A wireless device comprising:
a transmitter; and
a receiver,
wherein the wireless device is configured to:
transmit a trigger frame, the trigger frame allocating a plurality of subchannels to a plurality of STAs and indicating a length of an uplink (UL) multi-user (MU) Physical layer Protocol Data Unit (PPDU), receive, from a first STA of the plurality of STAs, a first PPDU frame including a first Media Access Control (MAC) Protocol Data Unit (MPDU) fragment in a first transmission on a subchannel allocated to the first STA, and receive, from a second STA of the plurality of STAs, a second PPDU frame in a second transmission on a subchannel allocated to the second STA, wherein a MPDU fragment length of the first MPDU fragment is determined by the first STA such that the first transmission and the second transmission end simultaneously, wherein the first PPDU frame and the second PPDU frame are included in an Orthogonal Frequency Division Multiple Access (OFDMA) UL MU transmission, and wherein the first MPDU fragment corresponds to a first subframe fragment of a plurality of subframe fragments divided from a first Aggregated MPDU (A-MPDU) subframe of an A-MPDU.

17. The wireless device of claim 16, wherein the first PPDU frame includes a second A-MPDU subframe that precedes the first MPDU fragment.

18. The wireless device of claim 16, wherein the wireless device is configured to:
transmit an immediate Acknowledgement (ACK) to the first STA after receiving the first PPDU frame, and
receive, after transmitting an immediate ACK, a third PPDU frame including a second fragment of the plurality of subframe fragments.

19. The wireless device of claim 16, wherein the MPDU fragment length is determined according to the indication of the length of the UL MU PPDU.

20. The wireless device of claim 16, wherein the OFDMA UL MU transmission includes a second MPDU fragment divided from a second A-MPDU subframe different from the first A-MPDU subframe.

* * * * *